Patented Sept. 1, 1953

2,650,927

UNITED STATES PATENT OFFICE 2,650,927

PROCESS FOR THE MANUFACTURE OF EPOXIDES

Edward James Gasson, Banstead, Alfred Frank Millidge, Coulsdon, and William Webster, Epsom, England, assignors to The Distillers Company Limited, Edinburgh, Scotland, a British company No Drawing. Application July 27, 1951, Serial No. 239,014. In Great Britain March 26, 1949

11 Claims. (Cl. 260—348.5)

The present application is a continuation-in-part of our patent application Serial No. 149,642 filed on March 14, 1950, now abandoned.

It relates to a proces for the preparation of 1:2-epoxy-2:4:4-trimethylpentane and refers in particular to the manufacture of said epoxide from 2:4:4-trimethylpentene-1 (alphadiisobutene) by the oxidation with molecular oxygen.

It is known that olefinic hydrocarbons such as hexylene, cyclohexene and cracked naphthas can be oxidised in the liquid phase by molecular oxygen and that the resulting reaction mixtures contain acids, glycols, unsaturated alcohols, peroxides and epoxides in complex mixtures in which the epoxides, however, form only a small proportion which would not justify technical production. The preparation of the olefine oxides may be aided according to this publication by the presence in the olefinic reaction mixture of alkaline earth hydroxides. It is further stated that alkalis may cause gumming and are therefore less desirable, and that when heavy metal hydroxides are used instead of alkaline earth hydroxides metallic driers are formed. This statement indicates that the formation of acids predominates in the oxidation reaction.

An object of the present invention is to provide a process whereby the above-named epoxide is produced in commercially practicable yields. It is a further object to devise a process according to which the oxidation of the said olefine can be carried out in a continuous manner.

According to the invention the process for the production of 1:2-epoxy-2:4:4-trimethylpentane comprises reacting 2:4:4-trimethylpentene-1 in the liquid phase at temperatures between 90° and 150° C. with molecular oxygen in the presence, as catalysts, of compounds of metals selected from the group consisting of cobalt, lead, manganese, iron, vanadium, nickel, tungsten, copper, cerium, zinc, cadmium, chromium and silver and maintaining the reaction mixture at a pH value of between about 7 and 10.5. The 2:4:4 - trimethylpentene - 1 (alpha - diisobutene) will be called in the following "the olefine."

The pH value is maintained preferably by adding an alkaline substance to the mixture during its oxidation. As alkaline substances for maintaining the pH value within the stipulated range inorganic bases or salts such as sodium hydroxide, potassium hydroxide, sodium carbonate or bicarbonate or buffer compounds, such as calcium carbonate, magnesium carbonate, magnesium oxide may be used. These substances may be added to the reaction mixture at the start or by continuous or intermittent feed, their quantity being governed by the pH prevailing in the reaction mixture. They are added preferably in the form of their aqueous solution or suspension. Intimate contact between the olefine to be oxidised and the neutralising agent has to be provided by means of thorough agitation.

In the publication above referred to there is contained a statement that the presence of iron, copper and other metals is undesirable as they cause polymerisation. It is therefore quite unexpected that the oxidation and the production thereby of epoxide should proceed smoothly and with large yields of said compound.

In order to ascertain the pH value of the reaction mixture a sample of the aqueous layer thereof or of an aqueous extract of the mixture is taken and the pH value of this is measured at room temperature. When the neutralising agent is added in the form of an aqueous solution or suspension the acids produced during the oxidation collect in the aqueous phase in the form of the corresponding salts, whilst the epoxide formed remains dissolved in the unreacted olefine together with ketone and other non-acid oxygenated products. Alternatively, or in addition thereto, the pH value may be controlled by the removal of acids as they are formed during the reaction, for example, by evaporation of formic acid with excess oxidising gas and steam.

As molecular oxygen, oxygen of high concentration such as commercial oxygen, or gases containing molecular oxygen such as air may be used.

The oxidation may be carried out at atmospheric pressure, but it is preferred to use increased pressure, for instance 40 lbs./sq. in. when the oxidation is effected at temperatures near the upper limit above indicated, for instance at about 140° C.

The metallic catalysts may be applied in the form of their salts with organic acids, for instance, actic acid, propionic acid, butyric acid or naphthenic acid. Tungsten and vanadium, on the other hand, may be used in the form of the alkali metal salts of their acids, such as sodium vanadate or sodium tungstate. The quantity of the metallic catalyst may vary to some extent and amounts of 0.1 to 1.0% have been found to give good results.

According to one embodiment of the present invention the reaction between oxygen and the olefine is restricted in such a manner that not more than about 60% of the olefine is oxidised because with increasing concentration of the epoxide secondary reactions set in until the formation of more or less valueless byproducts exceeds the formation of the desired epoxide. It is therefore expedient to terminate the reaction before the concentration of the epoxide in the reaction mixture reaches a maximum.

When carrying out the process of the invention in a continuous manner and the alkaline substance is added in an aqueous solution or suspension, it is a special modification of the invention to withdraw simultaneously with the epoxide containing oily phase a corresponding part of the aqueous phase containing the alkali salts of the acids formed. When strong alkalis, such as sodium hydroxide or potassium hydroxide are used it is essential that no great excess of the alkali should be present in the reaction mixture at any stage of the oxidation. It is therefore necessary to add the alkaline substances continuously or intermittently in small quantities so as to maintain the pH within the desired limits. The amount of reaction mixture withdrawn from the reaction medium is made up by the addition of the fresh olefine simultaneously with the solution or suspension of the alkaline substance carrying out withdrawal and addition most conveniently in a continuous manner. The withdrawn oily layer containing the 1:2-epoxy-2:4:4-trimethylpentane in unreacted olefine is worked up for the recovery of the epoxide by distillation or fractionation whereby first the unreacted olefine is recovered. The fraction containing the epoxide may be converted without further purification into its desired derivatives or isomers, such as the aldehyde, glycol, amine, and these derivatives may then be separated from the ketone initially also present, if required.

The recovered unreacted olefine may contain low boiling substances as well, and it is a further modification of the invention to free the recovered olefine from the said low boiling substances, for instance by extraction with water or by careful fractionation and then return the olefine thus purified to the oxidation stage.

The unchanged olefine recovered from the oxidation mixture may be used to make up a new batch or may be continuously returned to the oxidation stage if the reaction is carried out in a continuous manner. It has been found, however, that the recovered olefine, especially if it is obtained as the lowest boiling fraction by the fractionation of the reaction mixture, contains other low boilers as well, and it is a further feature of the invention to return to the oxidation stage the unchanged olefine after it has been freed from low boiling oxygenated products, for instance by extraction with water or by careful fractionation. Even then it has been found that the oxidation with recovered material may proceed at a lower rate than with fresh olefine. The initial high rate of oxidation, however, can be achieved by carrying out the oxidation at the start at a lower pH and later changing over to the preferred higher pH value.

The following examples illustrate the way in which the process of the invention may be carried out in practice:

*Example 1*

A mixture of 1075 grams of 2:4:4-trimethylpentene-1, 1.5 grams of cobalt naphthenate and 40 grams of light magnesium oxide was oxidised at 135°–140° C. and 200 lbs./sq. in. pressure, with air, at 150 litres/hour, for 6–7 hours in a well agitated stainless steel vessel. The exit gases contained practically no oxygen; about 7–8 moles of oxygen were absorbed. The product was virtually free of acids and ketonic or aldehydic material, but contained about 330 grams of 1:2-epoxy-2:4:4-trimethylpentane, being a yield of 47%, which was recovered by distillation together with other oxygenated compounds. The roughly separated constituents, or the crude product, were converted into 2:4:4-trimethylpentanal by treatment with phosphoric acid at 50° C.

*Example 2*

A mixture of 1000 cc. of commercial diisobutene, containing 80% delta-1 diisobutene, 1 gram cobalt naphthenate and a solution of 53 grams of sodium carbonate in 150 cc. of water was oxidised by blowing with air, in a stirred vessel, at 130° C., under 200 lbs. total pressure, with an air-flow of 110–120 litre/hour (measured at atmospheric pressure). After 2 hours the oxidate contained 60–70 grams/litre of epoxide, and this was isolated by fractional distillation of the oxidate, the epoxide boiling at 139–141° C./750 mm. Smaller quantities of methylneopentyl ketone were also present.

*Example 3*

A mixture of 1000 cc. of commercial diisobutene, 1 gram cobalt naphthenate and a solution of 50 grams magnesium sulphate (Epsom salts) in 500 cc. water was oxidised by blowing with air, in a stirred vessel at 130° C., under 200 lbs. total pressure, with an air-flow of 150 litre/hour. During the oxidation, 40% caustic soda solution was pumped in, at a rate of 30 cc./hour; the pH was maintained at 8–9, as measured at room temperature with indicators. After 4 hours the oxidate contained 130 gram/litre of epoxide. This was isolated by fractional distillation of the oxidate.

*Example 4*

A mixture of 1450 cc. purified 2:4:4-trimethylpentene-1 (alpha-diisobutene), 1.5 grams cobalt naphthenate and a solution of 25 grams disodium hydrogen phosphate ($Na_2HPO_4 12H_2O$) in 100 cc. water was oxidised by blowing with air, in a stirred vessel, at 130–140° C., under 200 lbs. total pressure, with an air-flow of 15 litre/hour. During the oxidation, 40% caustic soda solution was pumped in, at the rate of 25–30 cc./hour, the pH being maintained at 8–8.5. The oxidate, after 6 hours, contained 25% by weight of epoxide in the volume, and fractionation gave a yield of 55% by weight of alpha-diisobutene epoxide (B. P. 76–77° C./100 mm.) calculated on the diisobutene consumed in the oxygenation which amounted to 60%.

On the other hand, when a mixture of 1500 cc. commercial diisobutene, 1.5 grams cobalt naphthenate and 100 grams powdered caustic potash was oxidised by blowing with air, in a stirred vessel, at 135° C., under 200 lbs. total pressure, with an air-flow of 120 litre/hour, analysis at the end of the oxidation showed that no epoxide was formed.

*Example 5*

A mixture of 1075 grams of commercial diisobutene with 2 grams of lead naphthenate was oxidised by blowing with air, in a stirred vessel at 140° C., under 20 lbs. total pressure, with an air-flow of 400–450 litres/hour. During the oxidation a 15% aqueous solution of sodium carbonate was pumped in at about 150 cc./hour, the pH of the aqueous layer being maintained at about 8. After the oxidation for 2.1 hours the oily layer of the product yielded on distillation 312 grams of a fraction of B. P. 70–78° C./100 mm. containing 91% alpha-diisobutene epoxide, together with 472 grams of diisobutene.

Example 6

1075 grams of commercial diisobutene containing 1.5 grams of cobalt naphthenate was oxidised at 140° C. under 200 lbs. per sq. in. pressure by blowing in air at the rate of 200–250 litres/hour for 4 hours. During the oxidation a 15% by weight solution of sodium carbonate was pumped in at the rate of 70–75 cc./hour whereby the pH of the aqueous layer in the oxidation vessel was maintained at 7–8.5. There was practically complete absorption of oxygen. The product resulting from the reaction was separated into an aqueous and an oil layer and the latter contained about 30% of the desired epoxide. Fractionation of the oil layer yielded 332 grams of alpha-diisobutene epoxide boiling point 70–77° C./100 mm. Hg, the yield being 44% on the diisobutene oxidised.

Example 7

By replacing the 1.5 grams of cobalt naphthenate in Example 6 by 1 gram of manganese napththenate but otherwise carrying out the oxidation under the conditions described in Example 6 and continuing it for 2.1 hours a 49% conversion of diisobutene and a yield of alpha-diisobutene epoxide of 46% were obtained.

Example 8

The oxidation was carried out under the same conditions as described in Example 6 but the manganese naphthenate was replaced by 1.5 grams of iron naphthenate. After 1¾ hours a conversion of 55% and a yield of alpha-diisobutene epoxide of 45% was obtained.

Example 9

The process as described in Example 6 was repeated but instead of the cobalt naphthenate 0.03% of vanadium pentoxide dissolved in the alkali feed was pumped in. After 1¾ hours a conversion of the diisobutene of 47% and a yield of diisobutene epoxide of 47% was obtained.

Example 10

Example 9 was repeated but instead of the vanadium pentoxide 2% of sodium tungstate dissolved in the alkali feed was added to the reaction mixture. After 1½ hours 44.5% conversion of the diisobutene and a yield of diisobutene epoxide of 43.5% was obtained.

By replacing the metal salts used in the previous examples by one of the other metal salts enumerated previously similar results were obtained.

Example 11

The process was carried out in a continuous manner charging an autoclave which had a capacity of 2,000 cc. with 1,500 cc. (1,075 grams) of commercial diisobutene. The content of the autoclave was maintained at 140° C. and diisobutene at a rate of 750 cc. per hour and a 15% by weight aqueous sodium carbonate solution in which 0.1% by weight of vanadium pentoxide was dissolved at the rate of 150 cc. per hour were pumped into the autoclave. This made the residence time in the autoclave of the reaction mixture equal to about 2 hours. At the same time, air was pressed into the autoclave under a pressure of 200 lbs./sq. in. A quantity of 1,650 cc. reaction mixture was withdrawn continuously from the autoclave from which the epoxide was recovered. The conversion of the diisobutene amounted to 51% on the quantity fed and the yield of alpha-diisobutene epoxide 47%.

That the presence of a catalyst produces beneficial effects can be seen from the following test carried out with vanadium pentoxide as catalyst:

The oxidation was carried out in a continuous operation as described above, and after 60 hours the addition of vanadium pentoxide was ceased whereupon the oxygen absorption stopped suddenly. The rate of oxidation and of the epoxide production were immediately restored by the renewed addition of $V_2O_5$ in an amount equivalent to one hour's normal feed.

The substance "alpha diisobutene epoxide" mentioned in the above examples is also designated as 1:2-epoxy-2:4:4-trimethylpentane.

We claim:

1. Process which comprises reacting alpha-diisobutene in the liquid phase at temperatures between 90° and 150° C. with molecular oxygen in the presence as a catalyst of a compound of a metal selected from the group consisting of cobalt, lead, manganese, iron, vanadium, nickel, tungsten, copper, cerium, zinc, cadmium, chromium and silver and maintaining in the reaction mixture a pH between about 7 and 10.5 whereby 1:2-epoxy-2:4:4-trimethylpentane is produced.

2. Process as claimed in claim 1, wherein the pH value is maintained within the said range by the addition of an alkaline reacting substance to the mixture while the oxidation reaction proceeds.

3. Process as claimed in claim 1, wherein the metallic catalysts are applied in the form of their salts with organic acids.

4. Process as claimed in claim 3, wherein the organic acid is naphthenic acid.

5. Process according to claim 1, wherein the oxidation is effected at increased pressure.

6. Process according to claim 1, wherein the reaction is continued for from one half to ten hours.

7. Process according to claim 1, wherein the reaction is terminated before the concentration of epoxide in the reaction mixture reaches a maximum.

8. Process according to claim 1, wherein the reaction is terminated when not more than 60% of the alpha-diisobutene has been oxidised.

9. A process as claimed in claim 1, wherein alpha-diisobutene and the oxygen containing gas are fed to the reaction zone together with an alkaline solution to maintain the pH value within the required range and a corresponding volume of the reaction mixture is withdrawn to maintain the volume of liquid in the reaction zone constant and the desired 1:2-epoxy-2:4:4-trimethylpentane is recovered from the liquid withdrawn.

10. Process as claimed in claim 1, wherein tungsten is employed in the form of the alkali metal salt thereof.

11. Process as claimed in claim 1, wherein vanadium is employed in the form of the alkali metal salt thereof.

EDWARD JAMES GASSON.
ALFRED FRANK MILLIDGE.
WILLIAM WEBSTER.

References Cited in the file of this patent

UNITED STATES PATENTS

| Number | Name | Date |
| --- | --- | --- |
| 2,052,195 | Schneider | Aug. 25, 1936 |

OTHER REFERENCES

Bost, "J. American Chem. Soc.," vol. 63, October 1941, pp. 2790–2792.